Sept. 17, 1946.  W. O. THOMAS  2,407,803
FRUIT CLIPPER
Filed Feb. 2, 1944  2 Sheets-Sheet 1
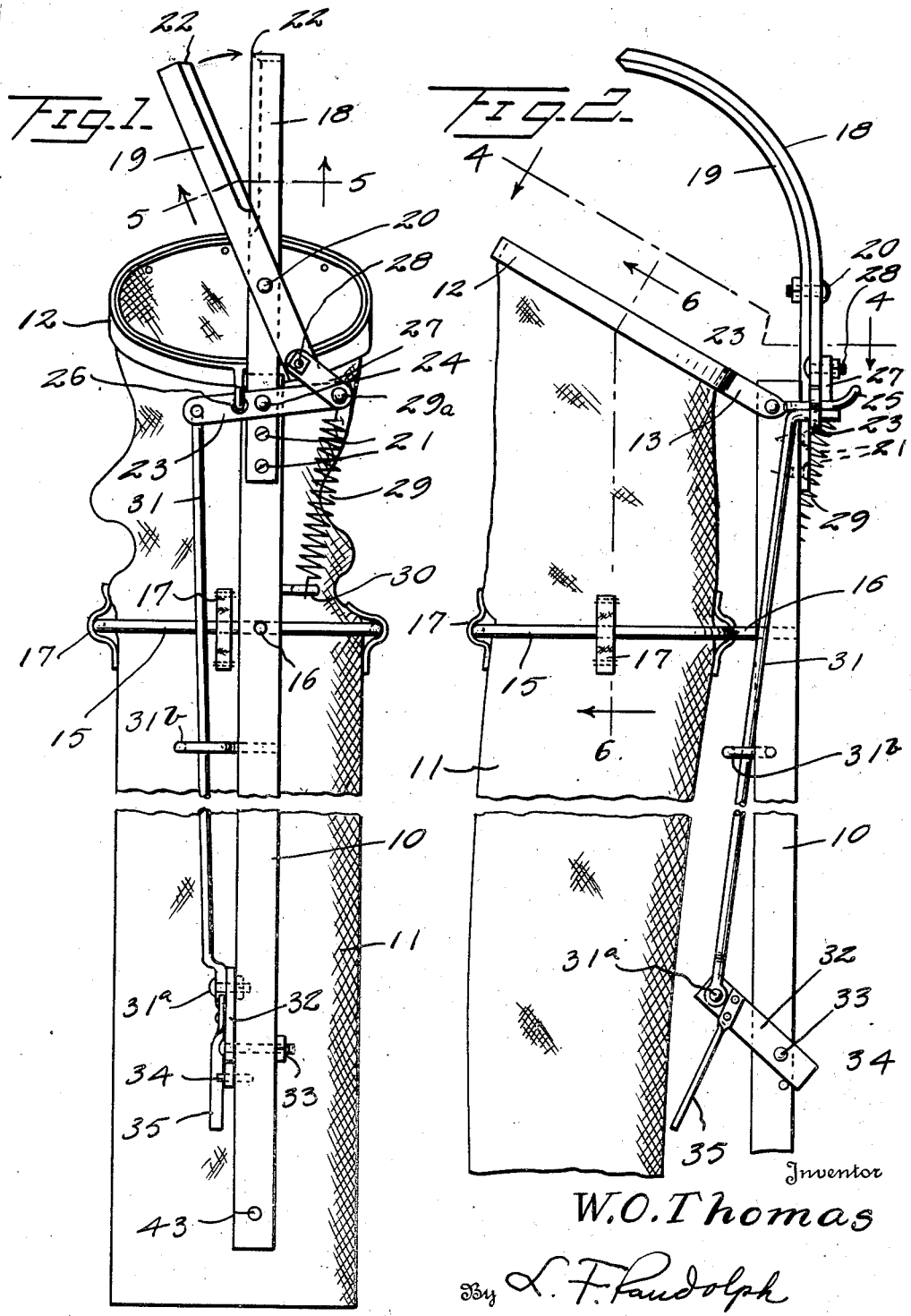
Inventor
W. O. Thomas
By L. F. Randolph
Attorney Sept. 17, 1946. W. O. THOMAS 2,407,803
FRUIT CLIPPER
Filed Feb. 2, 1944 2 Sheets-Sheet 2
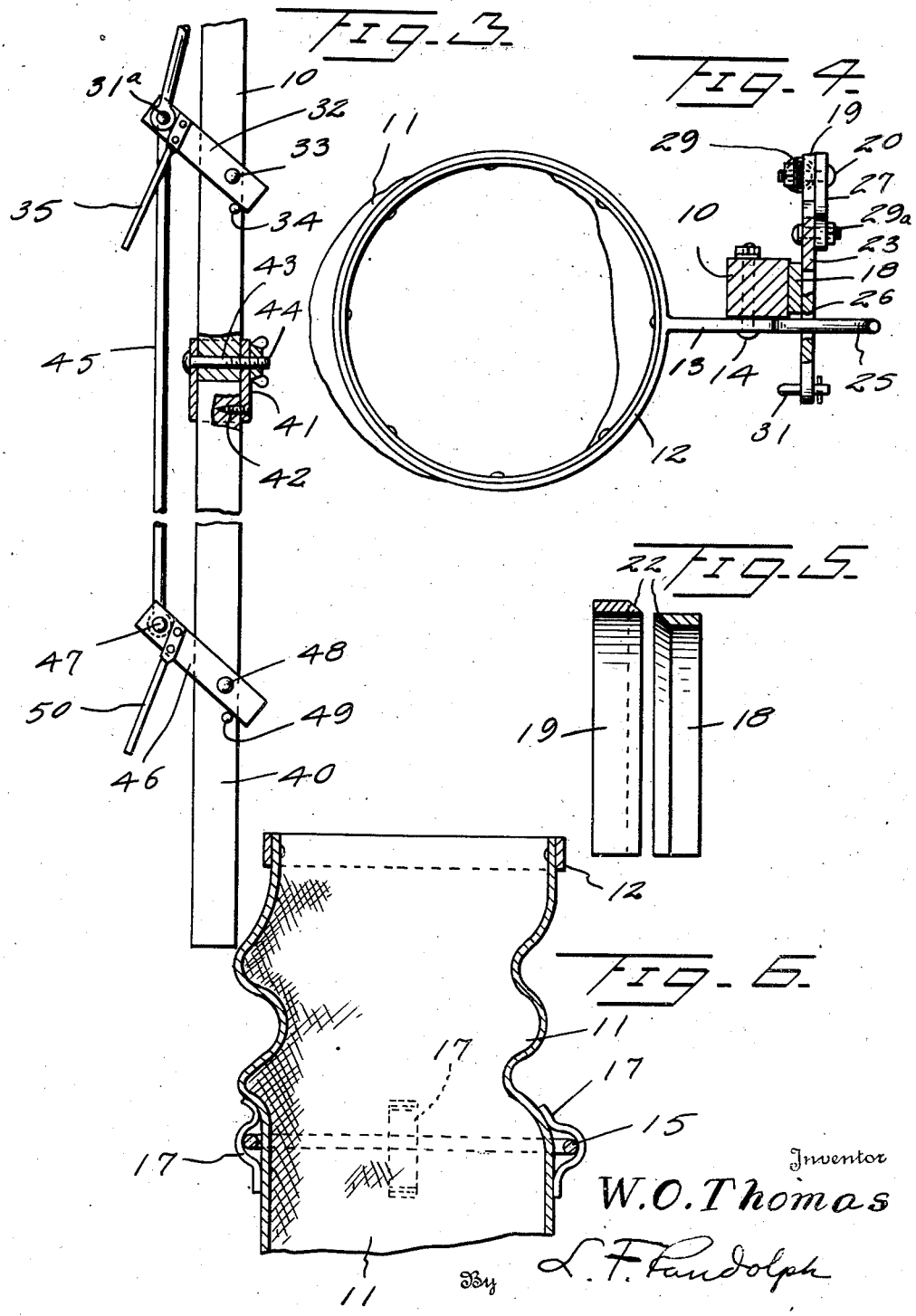

Patented Sept. 17, 1946

2,407,803

UNITED STATES PATENT OFFICE 2,407,803

FRUIT CLIPPER

Walter O. Thomas, Winter Park, Fla., assignor, by decree of distribution, to Carrie D. Thomas and W. Maureen Thomas Application February 2, 1944, Serial No. 520,789

4 Claims. (Cl. 56—336)

This invention relates to a fruit clipper or picker.

It is particularly aimed to provide a novel construction which will supplant and avoid the expense and trouble incident to the use of ladders and which will at the same time prove more expeditious and enable operation with less fatigue and particularly troubles of the arches of the feet experienced by standing on ladder rungs.

A particular object is to provide the novel structure wherein the entrance to the chute employed will be moved relatively close to the fruit during the act of picking or cutting the fruit to minimize danger of loss or failure to pass through the chute.

In addition it is aimed to provide a novel construction manually operable through levers and linkage, which is simple, inexpensive and durable.

The more specific objects and advantages will become apparent from a consideration of the description following taken in connection with accompanying drawings illustrating an operative embodiment.

In said drawings:

Figure 1 is a view of the picker in rear elevation;

Figure 2 is a view of the picker in side elevation;

Figure 3 is a view of the picker in side elevation, fragmentarily showing the use of an extension for the handle of the picker, certain parts being shown in section to disclose details;

Figure 4 is a cross-sectional view taken on the line 4—4 of Figure 2;

Figure 5 is a cross-sectional view taken on the line 5—5 of Figure 1; and

Figure 6 is a vertical section taken on the line 6—6 of Figure 2.

Referring specifically to the drawings, numeral 10 denotes a handle or staff of any desired length, adapted to support a tubular chute 11, which may be of canvas or other suitable material. This chute is preferably open at its top and bottom ends so that picked fruit will fall therethrough and due to friction against the inside of the chute, the fruit will be retarded in its descent and thus not become damaged when it strikes into a receptacle or other fruit at the discharge end of the chute.

At the upper edge, chute 11 is fastened to a ring 12 which is a lever since it has an arm 13 pivoted by means of a bolt or otherwise at 14 to the upper end of the staff at 10.

Below the ring 12, a positioning ring 15 is anchored by means of a lug 16 to the staff 10. Chute 11 passes through ring 15 and has flexible loops at 17 overlapping it.

The fruit being harvested is adapted to have its stem cut through the coaction of a fixed cutter blade 18 and a movable cutter blade 19 pivoted at 20 to such fixed cutter blade. The latter is fastened as by means of screws 21 to the upper end of staff 10 and it extends upwardly and forwardly with respect thereto. The cutter blade 19 is shaped similarly to that at 18 and as both are arcuate, as shown, they extend over the ring 12 and entrance to the chute 11. The meeting edges of the blades 18 and 19 are preferably sharpened as at 22.

A cross lever 23 is pivoted at 24 to the rear surface of the staff 10 and arm 13 has an extension or crank 25 which passes through an opening 26 in the cross lever. A relatively short link 27 is pivotally connected at 28 to the blade 19 and at 29 to the cross lever 23. The parts are normally held in the position shown in Figure 1, with the cutting edges of the blades slightly separated, through the action of a coil spring 29a fastened to the bolt or pivot 29 and to a staple 30 secured to the staff 10.

In order to manually operate the parts, a rod or link 31, slidable through a guide 31b, is pivotally connected at its ends to the cross lever 23 and an operating lever 32, the latter being pivoted at 33 to the staff 10 and urged into abutment with a stop 34 on the latter, through the contractile action of spring 29. A handle 35 is preferably provided on the lever 32.

In operation, the parts in the position shown in Figure 1, are arranged so that the stem of the fruit to be picked or harvested is between the blades 18 and 19 and in line with the ring 12. Handle 35 is thereupon moved away from the chute 11, causing link 31 to tilt the cross lever 23 and such cross lever 23 due to its connection with the crank 25, and with the cutter 19, simultaneously moves the ring closer to the cutters 18 and 19 and moves the cutter 19 toward the cutter 18 to sever the fruit. As a result, the parts are spaced sufficiently for effective engagement with the fruit and during the act of cutting the fruit moving into cutting position, the mouth or entrance of the chute and ring 12 are arranged closer to the fruit so that passage of the latter through the chute 11 is assured.

In some instances, as in picking unusually high fruits, I may provide an extension on the staff 10 as shown at 40 in Figure 3. This staff may have a sleeve 41 fastened at the top as at 42 and extending slightly beyond it, so as to form a socket for reception of the lower end of the staff 10. It will be noted that the latter has a hole 43 therethrough, to accommodate a detachable bolt 44 which secures the holder 41 and staff 10 together. The part 31a may be a bolt and a rod or link 45 is detachably fastened to it and to a supplemental actuating lever 46 as by means of a bolt at 47. This supplemental actuating lever 46 and associated parts function like that at 32, and it is pivoted at 48 to the extension 40 and urged against an abutment 49 by the action of the aforesaid spring 29. Also, a handle 50 may extend from the supplemental actuating lever 46 to function like that at 35. It will be understood that in operating these parts, manipulation of the handle 50 will effect the same result as the manipulation of the handle 35.

Various changes may be resorted to provided they fall within the spirit and scope of the invention.

I claim as my invention:

1. A fruit picker comprising a staff, a fruit receiver supported by the staff and provided with a pivotal member at its receiving end for holding said end of the receiver open, said pivotal member being provided with a crank arm extending outwardly from its pivot point, a cutter on the fruit opposing end of the staff comprising a stationary blade and a pivotal blade, a rocker supported by the staff and formed with an opening for receiving the crank arm at one side of the fulcum point of said rocker, a connection between the distal end of the rocker and the pivotal blade, a hand lever on the staff and a connection between the hand lever and the remaining end of the rocker.

2. A fruit picker comprising a staff, a fruit receiver supported by the staff and provided with a pivotal member at its receiving end for holding said end of the receiver open, said pivotal member being provided with a crank arm extending outwardly from its pivot point, a cutter on the fruit opposing end of the staff comprising a stationary blade and a pivotal blade, a rocker supported by the staff and formed with an opening for receiving the crank arm at one side of the fulcrum point of said rocker, a connection between the distal end of the rocker and the pivotal blade, a hand lever on the staff and a connection between the hand lever and the remaining end of the rocker, said connection between the rocker and the pivotal blade being in the form of a pivotal link.

3. A fruit picker comprising a staff, a fruit receiver supported by the staff and provided with a pivotal member at its receiving end for holding said end of the receiver open, said pivotal member being provided with a crank arm extending outwardly from its pivot point, a cutter on the fruit opposing end of the staff comprising a stationary blade and a pivotal blade, a rocker supported by the staff and formed with an opening for receiving the crank arm at one side of the fulcrum point of said rocker, a connection between the distal end of the rocker and the pivotal blade, a hand lever on the staff and a connection between the hand lever and the remaining end of the rocker, said connection between the rocker and the pivotal blade being in the form of a pivotal link, said blade being curved inwardly over the adjacent end of the receiver.

4. A fruit picker comprising a staff, a fruit receiver supported by the staff and provided with a pivotal member at its receiving end for holding said end of the receiver open, said pivotal member being provided with a crank arm extending outwardly from its pivot point, a cutter on the fruit opposing end of the staff comprising a stationary blade and a pivotal blade, a rocker supported by the staff and formed with an opening for receiving the crank arm at one side of the fulcrum point of said rocker, a connection between the distal end of the rocker and the pivotal blade, a hand lever on the staff and a connection between the hand lever and the remaining end of the rocker, said crank arm being curved upwardly at its free end.

WALTER O. THOMAS.